(12) United States Patent
Hayakawa

(10) Patent No.: US 10,371,922 B2
(45) Date of Patent: Aug. 6, 2019

(54) OPTICAL APPARATUS

(71) Applicant: CANON KABUSHIKI KAISHA, Tokyo (JP)

(72) Inventor: Makoto Hayakawa, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 170 days.

(21) Appl. No.: 15/426,398

(22) Filed: Feb. 7, 2017

(65) Prior Publication Data

US 2017/0227732 A1 Aug. 10, 2017

(30) Foreign Application Priority Data

Feb. 10, 2016 (JP) .................. 2016-024158

(51) Int. Cl.
| | |
|---|---|
| *G03B 15/05* | (2006.01) |
| *G02B 7/105* | (2006.01) |
| *F21V 8/00* | (2006.01) |
| *H04N 5/225* | (2006.01) |
| *G02B 7/10* | (2006.01) |

(Continued)

(52) U.S. Cl.
CPC .......... *G02B 7/105* (2013.01); *G02B 6/0051* (2013.01); *G02B 6/0075* (2013.01); *G02B 7/102* (2013.01); *G02B 7/14* (2013.01); *G03B 15/05* (2013.01); *G03B 17/14* (2013.01); *H04N 5/2254* (2013.01); *H04N 5/2256* (2013.01); *G03B 2215/0514* (2013.01)

(58) Field of Classification Search
CPC . G02B 7/105; G02B 7/04; G02B 7/09; G02B 7/102; G02B 7/14; G02B 6/0051; G02B 6/0075; G02B 7/023; G03B 15/05; G03B 17/14; G03B 17/565; G03B 17/568; G03B 2215/0514; G03B 2215/0567; G03B 2215/0575; G03B 2215/0571; G03B 2215/0589; G03B 2215/0592

See application file for complete search history.

(56) References Cited

U.S. PATENT DOCUMENTS

| | | | |
|---|---|---|---|
| 4,423,470 A | 12/1983 | Naito et al. | |
| 5,126,881 A * | 6/1992 | Crema ................. | G03B 17/566 359/611 |

(Continued)

FOREIGN PATENT DOCUMENTS

| | | |
|---|---|---|
| JP | H02-44265 Y2 | 11/1990 |
| JP | 2006162717 A | 6/2006 |
| JP | 2007047192 A | 2/2007 |

*Primary Examiner* — Y M. Lee
(74) *Attorney, Agent, or Firm* — Rossi, Kimms & McDowell LLP

(57) ABSTRACT

The optical apparatus includes a lens barrel, a lens held by the lens barrel, and a light emitter and an accessory attachment portion that are provided in an object-side end portion of the lens barrel so as to be located outside further than the lens in a radial direction of the lens barrel, the light emitter emitting an illumination light, the accessory attachment portion allowing detachable attachment of an accessory. The accessory attachment portion is located inside further than the light emitter in the radial direction. The lens barrel is provided with a slope surface formed so as to decrease an outer diameter of the lens barrel toward an object side end of the lens barrel.

13 Claims, 5 Drawing Sheets

(51) Int. Cl.
*G02B 7/14* (2006.01)
*G03B 17/14* (2006.01)

(56) References Cited

U.S. PATENT DOCUMENTS

2017/0269348 A1* 9/2017 Shinji .................... G02B 23/26
2017/0363834 A1* 12/2017 Kitamura ................ G02B 7/02

* cited by examiner

OPTICAL APPARATUS

BACKGROUND OF THE INVENTION

Field of the Invention

The present invention relates to optical apparatuses such as interchangeable lenses each including a lens barrel and particularly relates to optical apparatuses each suitable to short distance image capturing (macro image capturing).

Description of the Related Art

An interchangeable lens for macro image capturing is disclosed in Japanese Patent Laid-Open No. 2007-047192. This interchangeable lens has an illumination function of illuminating an object with an illumination light from multiple light-emitting diodes (LEDs) provided in a front end portion of its lens barrel surrounding a lens disposed at a most object-side position in an optical axis direction of the lens barrel. This interchangeable lens is provided with, radially outside further than the LEDs in the front end portion of the lens barrel, an accessory attachment portion to which accessories such as optical filters are attachable.

Specifically, an internal screw for the attachment of the optical filter is formed in an inner circumference of a cylindrical portion protruding further than the LEDs toward the object side. This is because an engagement of an external screw of the optical filter with the internal screw requires a height in the optical axis direction.

However, the interchangeable lens disclosed in Japanese Patent Laid-Open No. 2007-047192 may be unable to sufficiently illuminate the object since the illumination light from the LEDs is blocked by the cylindrical portion or is reflected by an inner surface of the optical filter attached inside the cylindrical portion so as to cover the LEDs.

Furthermore, in the macro image capturing, the cylindrical portion formed radially outside further than the LEDs and protruding toward the object side may contact an obstacle located around the object, which may be unable to bring the front end portion of the lens barrel sufficiently close to the object.

SUMMARY OF THE INVENTION

The present invention provides an optical apparatus capable of sufficiently illuminating an object with an illumination light from a light emitter provided in a front end portion of a lens barrel while having an accessory attachment portion in the front end portion.

The present invention provides as an aspect thereof an optical apparatus including a lens barrel, a lens held by the lens barrel, and a light emitter and an accessory attachment portion that are provided in an object-side end portion of the lens barrel so as to be located outside further than the lens in a radial direction of the lens barrel, the light emitter emitting an illumination light, the accessory attachment portion allowing detachable attachment of an accessory. The accessory attachment portion is located inside further than the light emitter in the radial direction. The lens barrel is provided with a slope surface formed so as to decrease an outer diameter of the lens barrel toward an object-side end of the lens barrel.

The present invention provides as another aspect thereof an optical apparatus including a lens barrel. The apparatus includes a base barrel located outermost in the lens barrel in its radial direction, and a movable barrel holding a first lens located at a most object-side position in an optical axis direction in which an optical axis of the lens barrel extends, being located inside further than the base barrel in the radial direction and being protrudable to an object side with respect to the base barrel. In a state where the movable barrel is protruded to the object side with respect to the base barrel, the entire movable barrel and the entire base barrel are located inside further than a conic surface whose apex is located at a minimum focusing distance (minimum photographing distance) or a working distance on the optical axis and that passes through an intersection line at which a plane passing through an object-side surface vertex of the first lens and being orthogonal to the optical axis intersects with a cylindrical surface extending from an outer circumferential surface of the movable barrel toward the object side.

Further features and aspects of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 1:
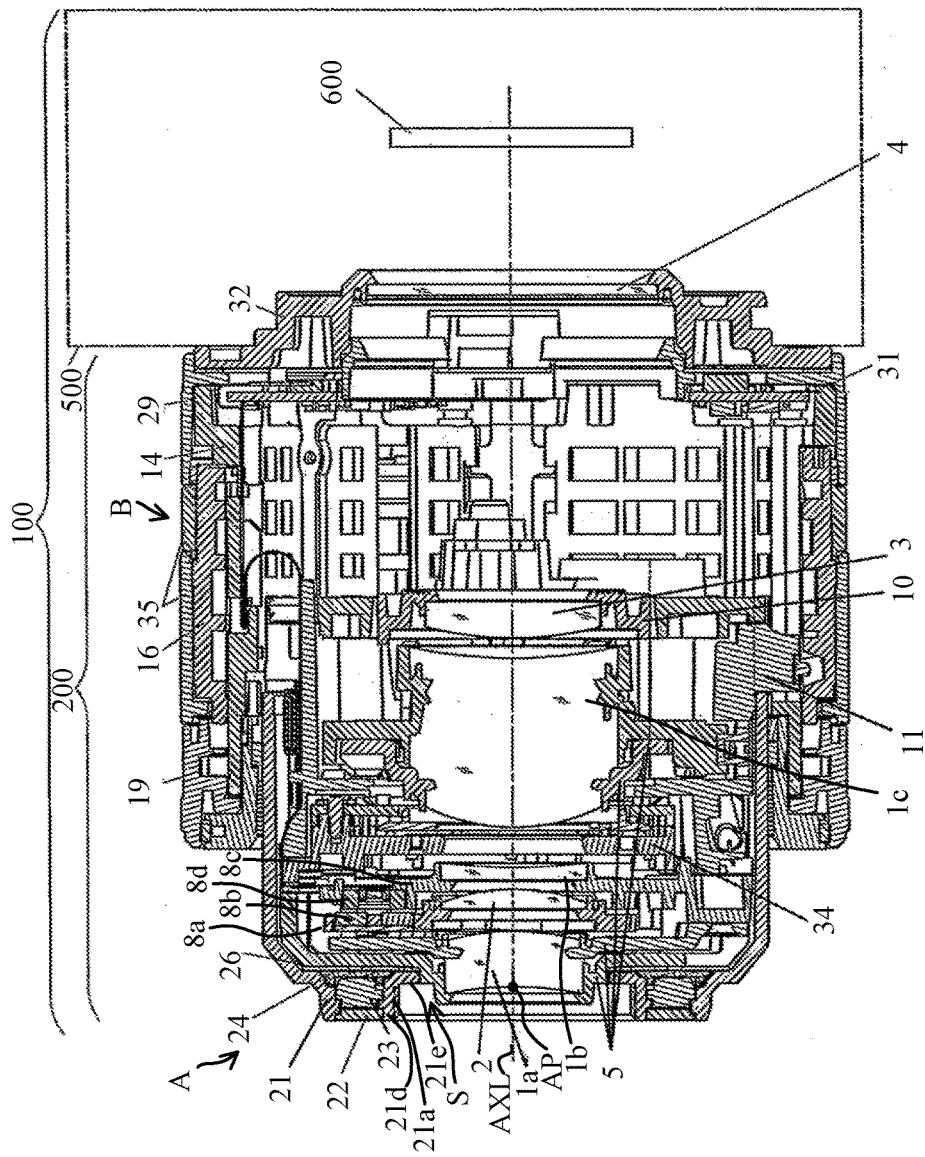
FIG. 1 is a sectional view illustrating a configuration of an image capturing system including an interchangeable lens (in a protruded state) that is an embodiment of the present invention.
Figure 2:
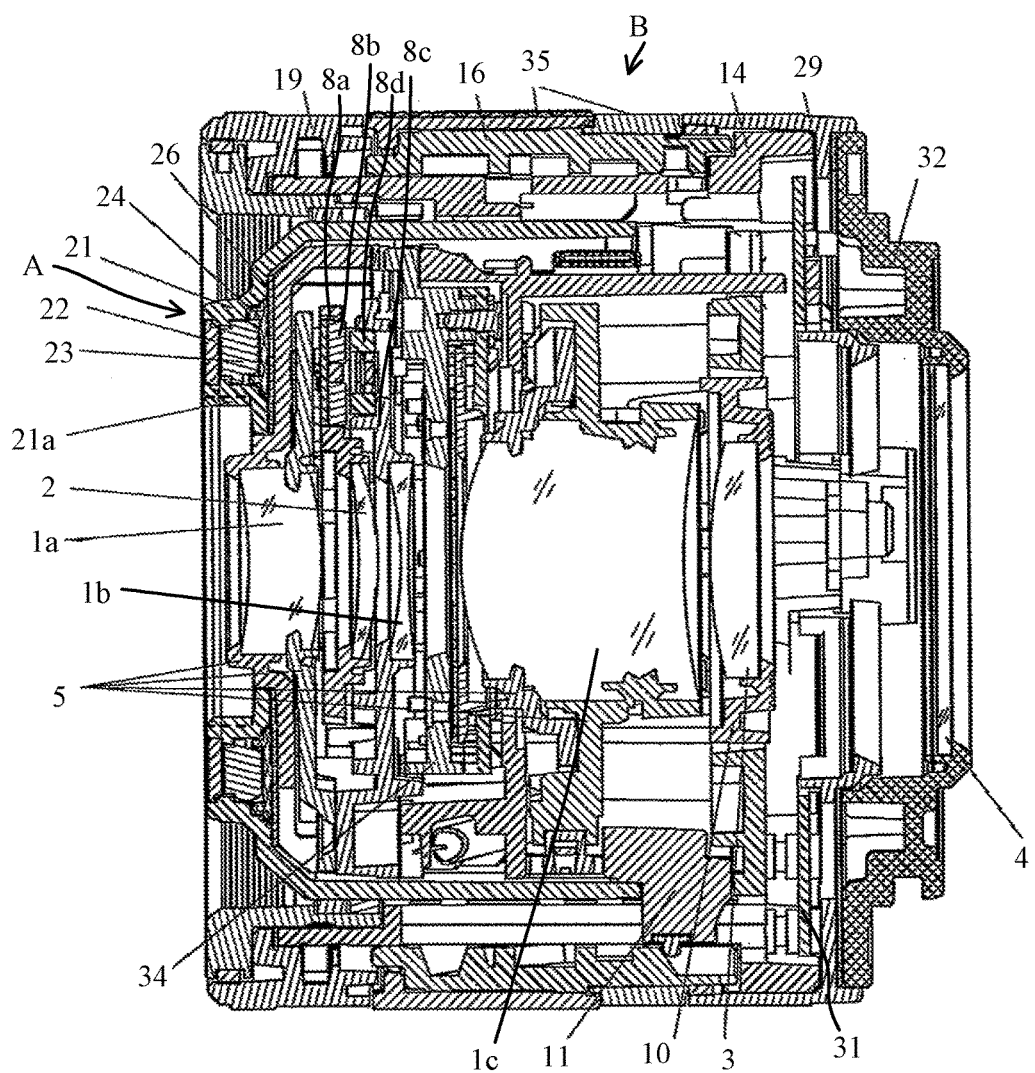
FIG. 2 is a sectional view of the interchangeable lens (in a retracted state) of the embodiment.
Figure 3A:
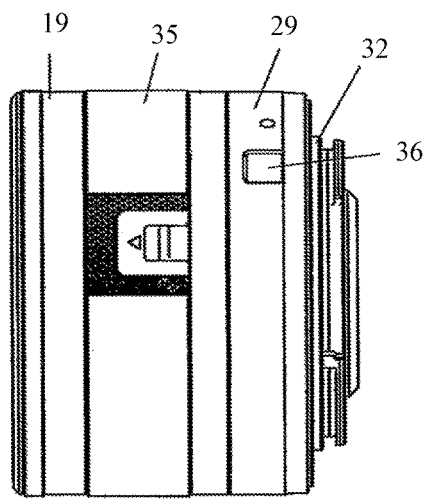
FIGS. 3A and 3B are external side views of the interchangeable lens (in the retracted and protruded states) of the embodiment.
Figure 3B:
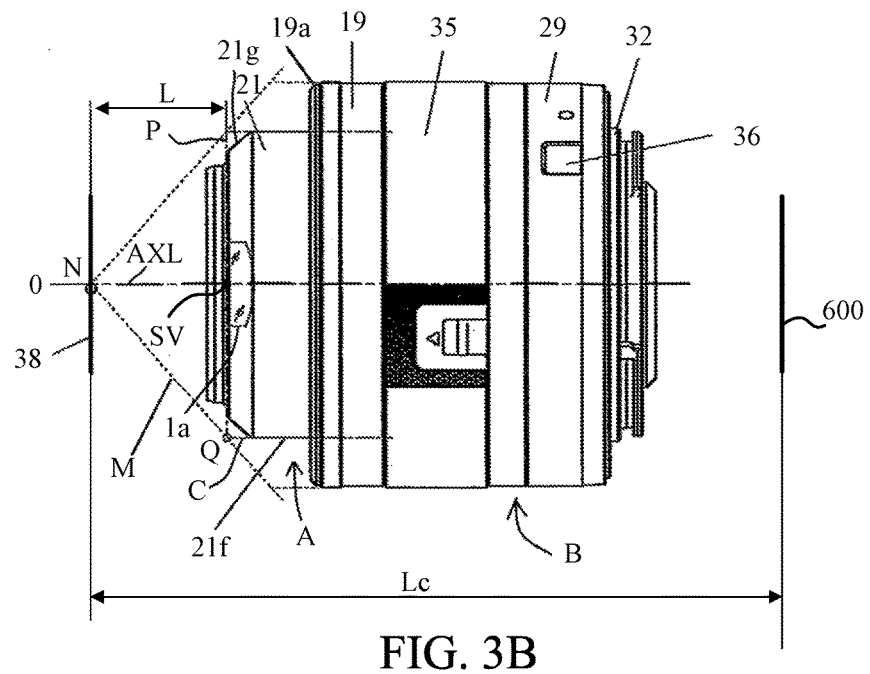

FIG. 1 illustrates a configuration of an image capturing system constituted by an interchangeable lens 200 as an optical apparatus that is an embodiment of the present invention and a digital camera 500 as an image capturing apparatus to which the interchangeable lens 200 is detachably attachable. FIG. 1 is a sectional view of the interchangeable lens 200 in a protruded state. In a direction in which an optical axis AXL of the interchangeable lens 200 (of a lens barrel described later) illustrated in FIG. 1 extends, the left side is hereinafter referred to as "an object side" or "a front side", and the right side that is an opposite-to-object side is hereinafter referred to as "an image side" or "a rear side". Furthermore, FIG. 2 illustrates the interchangeable lens 200 in a retracted state. FIGS. 3A and 3B illustrate exteriors of the interchangeable lens 200 in the retracted state and the protruded state, respectively.

The digital camera (hereinafter simply referred to as "a camera") 500 is provided thereinside with an image sensor 600 such as a CCD sensor or a CMOS sensor.

The camera 500 may be a mirrorless digital camera, a single reflex digital camera or a digital video camera.

Although this embodiment describes a lens-interchangeable image capturing system, a lens-integrated camera (optical apparatus) is an alternative embodiment of the present invention.

The interchangeable lens 200 includes an image capturing optical system forming an optical image of an object (object image). The interchangeable lens 200 of this embodiment is a fixed-focal length macro lens suitable for macro image capturing of a short-distance object. In the interchangeable lens 200, a movable barrel unit A and a base barrel unit B constitute a lens barrel. When image capturing is performed, the lens barrel is in the protruded state where the movable barrel unit A is protruded with respect to the base barrel unit B. In this protruded state, the lens barrel has a taper shape as a whole. On the other hand, when the image capturing is not performed, the lens barrel is in the retracted state where the movable barrel unit A is housed (retracted) in the base barrel unit B, which enables a user to carry a compact image capturing system.

The image capturing optical system includes, in order from the object side to the image side, a front-most (most object-side) lens 1a as a first lens, an image stabilizing lens 2, a front intermediate lens 1b, a diaphragm (aperture stop) unit 34, a rear intermediate lens 1c, a focus lens 3 and a rear-most lens 4.

A first holding frame 5 holds the front-most lens 1a, the front intermediate lens 1b and the rear intermediate lens 1c. The image stabilizing lens 2 is shifted in directions orthogonal to the optical axis AXL by an image stabilizing actuator constituted by a magnet 8b held by a shiftable holding frame 8a holding the image stabilizing lens 2 and a coil 8d held by an image stabilizing base frame 8c fixed to the first holding frame 5 to perform image stabilization (image blur correction).

A main holding frame 11 is a base member of the movable barrel unit A. The first holding frame 5, the diaphragm unit 34 and a front barrel 21 surrounding these first holding frame 5 and diaphragm unit 34 are screw-fixed to the main holding frame 11. The front barrel 21, the main holding frame 11, the first holding frame 5, the lenses 1a-1c, 2 and 3, the diaphragm unit 34 and others constitute the movable lens barrel unit A. In a front end portion (object-side end portion) located at a most object side-position in the front barrel 21, a light emitter and an accessory attachment portion are provided.

The front end portion may be defined as follows.

The front end portion may be a portion from a light-exiting surface of a diffusing plate 22 described later to an image-side (image sensor-side) surface vertex, in other words, a surface apex or a surface top of the front-most lens 1a. Alternatively, the front end portion may be a portion from the light-exiting surface of the diffusing plate 22 to image-side (image sensor-side) surfaces of light guides 23 described later.

A focus holding frame 10 holds the focus lens 3 and is moved in an optical axis direction as the direction in which the optical axis AXL extends to perform focusing. The focus holding frame 10 is driven by a driving mechanism while being guided by a guiding mechanism. The diaphragm unit 34 controls an amount of light passing through the image capturing optical system to reach the image sensor 600.

A guiding barrel 14 as a base member of the base barrel unit B is provided with guiding groove portions formed at three circumferential positions so as to extend in the optical axis direction. A cam ring 16 is mounted to the guiding barrel 14 with a bayonet coupling mechanism so as to be rotatable about the optical axis AXL around an outer circumference of the guiding barrel 14 with its movement in the optical axis direction being restrained. The cam ring 16 is provided with cam groove portions for causing the movable barrel unit A to protrude and retract with respect to the base barrel unit B. The main barrel 11 is provided with cam followers engaging with the cam groove portions and the guiding groove portions. Thereby, a user's rotational operation of the cam ring 16 moves the movable barrel unit A in the optical axis direction. A main circuit board 31 on which a lens driving IC, a CPU and others are mounted is fixed to a rear end of the guiding barrel 14.

A mount 32 is screw-fixed to the guiding barrel 14. The mount 32 is provided with a contact block (not illustrated) electrically connected to the main circuit board 31 via wiring such as an FPC (not illustrated).

The mount 32 further holds the rear-most lens 4. The interchangeable lens 200 is bayonet-coupled with the mount 32 and thereby is attached to the camera 500. The interchangeable lens 200 attached to the camera 500 can communicate with the camera 500 and receives an electrical power supply from the camera 500 through the contact block. The interchangeable lens 200 receiving the electrical power supply from the camera 500 is capable of driving the diaphragm unit 34, the image stabilizing actuator and a focus actuator described later and of turning on the light emitter.

An exterior ring 29 has a cylindrical portion covering a rear side outer circumference of the guiding barrel 14 and is fixed by being sandwiched at its flange portion between the guiding barrel 14 and the mount 32.

A manual focus (MF) ring 19 is supported rotatably about the optical axis AXL around a front side outer circumference of the guiding barrel 14. A user's rotational operation of the MF ring 19 is detected by a sensor (not illustrated). A focus motor as the focus actuator is driven according to a rotation amount of the MF ring 19 and thereby the focus lens 3 is moved to perform manual focus. The focus lens 3 is also moved by the focus motor driven in response to an AF control signal from the camera 500 to perform autofocus (AF).

An operation ring 35 is mounted to the cam ring 16 so as to cover an outer circumferential surface of the cam ring 16. The guiding barrel 14, the cam ring 16, the mount 32, the exterior ring 29, the MF ring 19, the operation ring 35 and others constitute the base barrel unit B that is disposed outermost in a radial direction (orthogonal to the optical axis AXL) in the lens barrel.

The exterior ring 29, the MF ring 19, the operation ring 35 are outermost circumferential members disposed outermost in the radial direction in the base barrel unit B.

FIGS. 3A and 3B illustrate an illumination switch 36 that is ON/OFF-operated by a user to turn on and off LED elements 27 described later.

Figure 4:
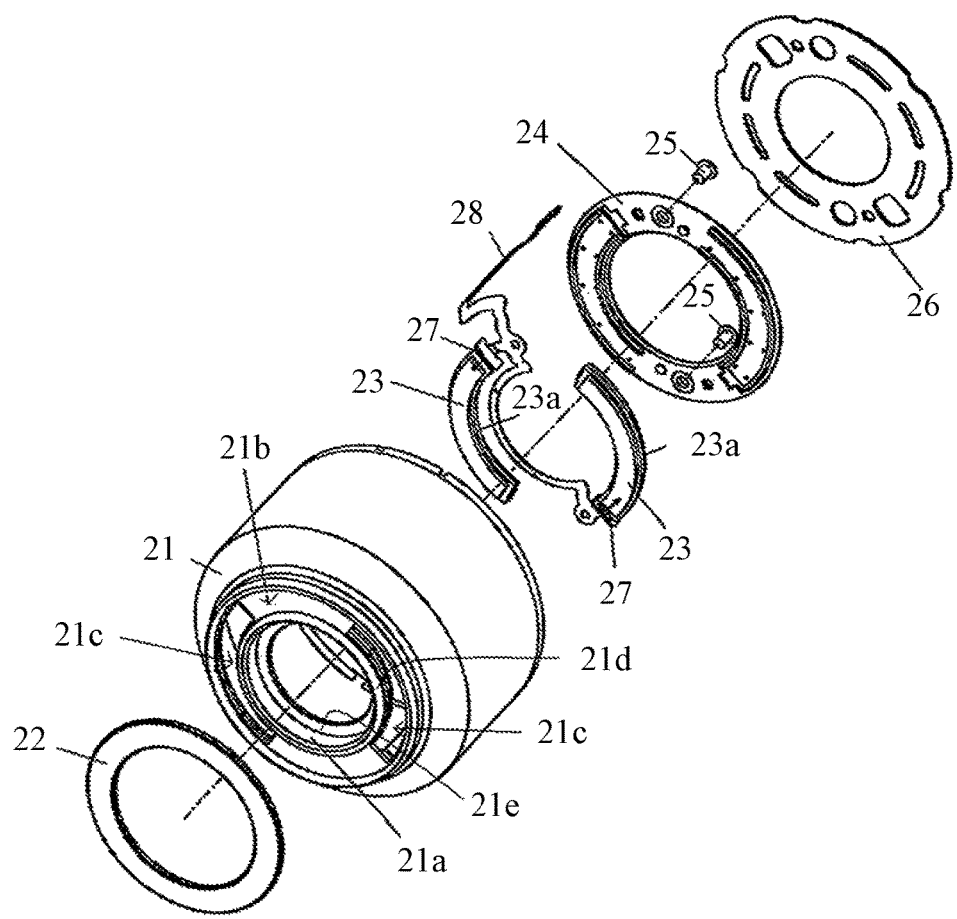
FIG. 4 is an exploded perspective view of a light emitter provided in the interchangeable lens of the embodiment.

Next, description will be made of configurations of the light emitter and the accessory attachment portion provided in the front end portion of the front barrel 21 with also referring to FIG. 4

The light emitter includes, in order from the object side, the diffusing plate (diffusing member) 22 having a ring shape, the two light guides (light-guiding members) 23 each having a circular arc shape and a cover plate 24 having a ring shape. In addition, at one end surfaces of the two light guides 23 in their circular arc directions, the LED elements 27 as light sources are disposed such that their light-emitting surfaces face the above circular-arc-direction end surfaces of the light guides 23. The two LED elements are mounted on a flexible printed wiring board 28 together with the two light guides 23, which constitutes an LED unit.

The diffusing plate 22 is assembled, from the front side, to a concave portion 21b formed in the ring-shaped front end portion of the front barrel 21 and is adhered to a bottom surface (planar surface) of the concave portion 21b. The LED unit and the cover plate 24 are assembled, from the rear side, to the front end portion of the front barrel 21 and are fixed thereto with two screws 25. The two light guides 23 are disposed, together with the two LED elements 27, inside circular arc-shaped hole portions formed at two circumferential areas in the concave portion 21b.

Thereby, front surfaces of the light guides 23 face a rear surface of the diffusing plate 22. At the rear of the cover plate 24, a sheet 26 having a ring shape is disposed.

Furthermore, on an inner circumferential surface of a cylindrical portion 21d having a ring shape and forming a radially inside wall of the concave portion 21b in which the light emitter is disposed, that is, inside further than the light emitter in the radial direction, a filter screw 21a that is an internal screw is formed as the accessory attachment portion. At a rear end of an inner circumferential surface of the cylindrical portion 21d, a planar portion 21e having a ring shape and facing frontward is provided. As illustrated in FIG. 1, from a circular opening formed inside the planar portion 21e, a lens holding portion of the first holding frame 5 that is a portion holding the front-most lens 1a protrudes frontward. This configuration forms a concave space S facing the filter screw 21a and opens frontward. An optical filter as an accessory such as a protecting filter has, on its outer circumferential surface, an external screw. The optical filter is attached to the front barrel 21 so as to cover the front-most lens 1a by engagement of the external screw with the filer screw 21a in the concave space S.

As just described, in this embodiment, the light emitter is provided outside further than the front-most lens 1a in the radial direction in the front end portion as a most object-side portion of the front barrel 21 (movable barrel unit A). In addition, in the front end portion of the front barrel 21, the filter screw 21a is provided outside further than the front-most lens 1a in the radial direction and inside further than the light emitter in the radial direction.

The light emitter and the filter screw 21a are disposed so as to be juxtaposed in the radial direction with respect to an object-side surface vertex SV of the front-most lens 1a. In other words, the filter screw 21a is provided at a position on the image (opposite-to-object) side further than the light-exiting surface of the diffusing plate 22 in the light emitter. In further other words, in the optical axis direction of the lens barrel, at least a part of the light emitter is located at the same position as that of at least a part of the filter screw 21a. Moreover, the filter screw 21a is provided on the image side further than the light-exiting surface of the diffusing plate 22. That is, the filter screw 21a is not provided at a position protruding frontward further than the light emitter, but is disposed at the same position (area) in the optical axis direction as that of the light emitter. This configuration enables the front-most lens 1a to be brought closer to the object as compared with a case where the filter screw is provided in the cylindrical portion protruding frontward further than the light emitter. In addition, the illumination light emitted from the light emitter is not blocked by the cylindrical portion 21d in which the filter screw 21a is provided.

The diffusing plate 22 is formed of a lacteous acrylic material in order to diffuse the illumination light entering from the LED elements 27 through the light guides 23. The diffusing plate 22 has a shape determined as a result of consideration of a distribution characteristic of the illumination light and a front-view appearance of the light emitter. The diffusing plate 22 may be made of materials other than the lacteous acrylic material and may have a textured light-exiting surface.

A flexible printed wiring board 28 on which the LED elements 27 are mounted is connected to the main circuit board 31. Applying electric currents to the LED elements 27 from the main circuit board 31 receiving the electric power supply from the camera 500 through the flexible printed wiring board 28 turns on the LED elements 27. Each of the light guides 23 is formed of a transparent acrylic material. The light guide 23 has a white-painted rear surface 23a facing the flexible printed wiring board 28.

The illumination light exiting from the LED elements 27 in an arrowed direction in FIGS. 3A and 3B is guided by the light guides 23 to their circular-arc directions. The illumination light is reflected by the white-painted rear surfaces 23a of the light guides 23, and thereby the white-painted rear surfaces 23a become secondary light sources. The reflected illumination light exits from the front surfaces of the light guides to enter the diffusing plate 22. With this configuration, the illumination light exits from the entire light guides 23 and is diffused by the diffusing plate 22. Thereby, an illumination light having an even light distribution exits from the light emitter. The illumination light having such an even light distribution is projected to the object close to the front-most lens 1a without illumination unevenness.

The sheet 26 is formed of a soft material such as urethane or rubber and is fixed to a rear surface of the cover plate 24 with a double-faced tape. The sheet 26 is sandwiched, as illustrated in FIG. 1, between the front barrel 21, the cover plate 24 and the first holding frame 5 so as to fill a space therebetween. This sheet 26 prevents the illumination light emitted from the LED elements 27 from entering inside the lens barrel and prevents dust and water from entering thereinside through a gap between an inner circumferential surface of the above-described circular opening of the front barrel 21 and an outer circumferential surface of the first holding frame 5.

Next, with referring to FIG. 3B, description will be made of the taper shape of the lens barrel in the protruded state where the movable barrel unit A (front barrel 21) is most protruded with respect to the base barrel unit B. FIG. 3B illustrates an object surface 38 located at a minimum focusing distance Lc from an image capturing surface of the image sensor 600. The object surface 38 is hereinafter referred to as "a closest object surface". A distance from the object-side surface vertex SV of the front-most lens 1a to the closest object surface 38 is a working distance L. A cylindrical outer circumferential surface 21f of the front barrel 21 corresponds to an outer circumferential surface of the movable barrel unit A.

In FIG. 3B, a point at the minimum focusing distance Lc or the working distance L on the optical axis AXL (that is, an intersection point between the optical axis AXL and the closest object surface 38) is represented by N. Furthermore, a conic surface whose apex is located at the point N and that passes through an intersection line Q at which a plane P passing through the object-side surface vertex SV of the front-most lens 1a and being orthogonal to the optical axis AXL intersects with a cylindrical surface extending from the outer circumferential surface 21f of the movable barrel unit A toward the object side is represented by M. With the above definitions, the entire movable barrel unit A and the entire base barrel unit B located most outside in the radial direction in the lens barrel are located inside further than the conic surface M in the radial direction.

The interchangeable lens disclosed in Japanese Patent Laid-Open No. 2007-047192 has the cylindrical portion formed so as to protrude frontward from its intersection line Q located on an outermost circumferential surface of the front end portion of the lens barrel, and the internal screw (filter screw) is formed on the inner circumference of the cylindrical portion. That is, the cylindrical portion in which the filter screw is formed protrudes outside further than the conic surface M in the radial direction.

On the other hand, in this embodiment, the filter screw 21*a* is provided inside further than the light emitter in the radial direction, which makes it unnecessary to provide, at the position of the intersection line Q, a cylindrical portion for forming the filter screw. Thus, the front end portion of the front barrel 21 can have, in its outermost circumferential surface, a slope surface (inclined surface) 21*g* like a chamfered corner surface, which enables providing to the front barrel 21 a taper shape narrowing toward its front end (that is, the front barrel 21 has the slope surface narrowing toward its front end portion). Moreover, employing the configuration in which the movable barrel unit A protrudes with respect to the base barrel unit B located radially outside further than the movable barrel unit A enables providing to the entire lens barrel a taper shape narrowing from the base barrel unit B toward the front end.

Figure 5:
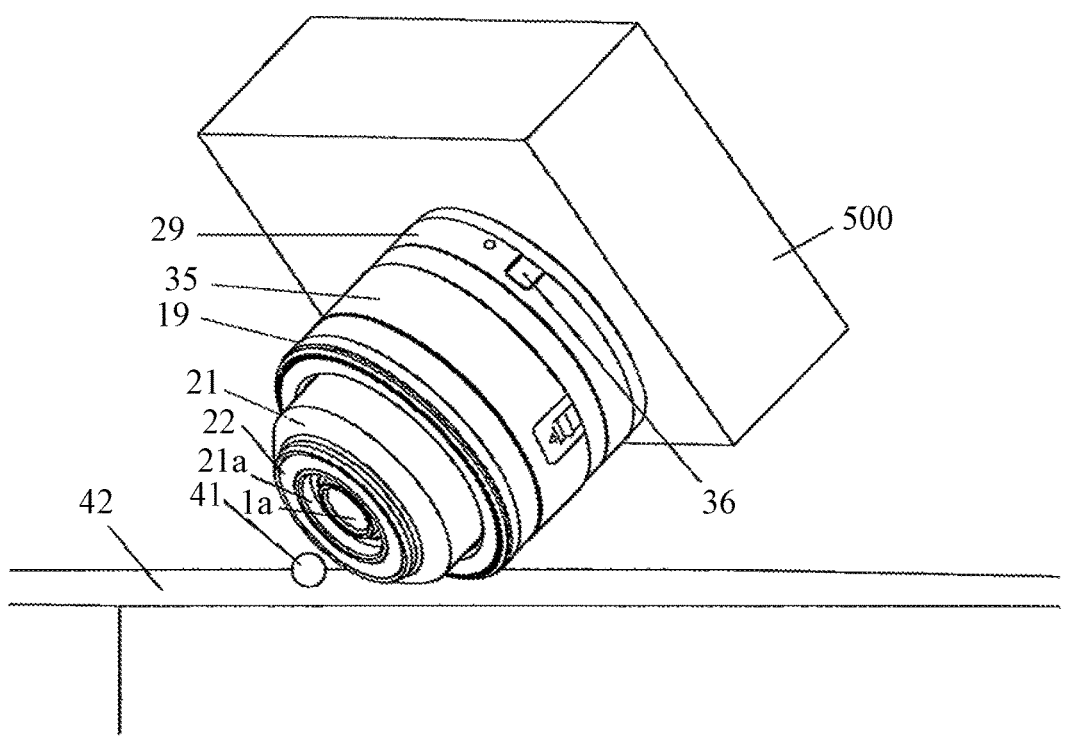
FIG. 5 illustrates an example of macro image capturing using the interchangeable lens of the embodiment.

FIG. 5 illustrates an example of macro image capturing using the image capturing system of this embodiment. An object 41 is located on a planar surface 42. The lens barrel has the above-described taper shape, so that macro image capturing with the front-most lens 1*a* being very close to the object 41 can be performed. In particular, since the above-described slope surface 21*g* is provided to the front barrel 21, the front barrel 21 does not contact the planar surface 42 as an obstacle until the front-most lens 1*a* sufficiently approaches the object 41 from a direction oblique to the planar surface 42. Therefore, it is possible to perform macro image capturing from various angles with respect to the object. Furthermore, providing the slope surface 21*g* to the front barrel 21 makes it easy to insert the front end of the lens barrel into a narrow space. Moreover, providing the slope surface 21*g* to the front barrel 21 can prevent the front barrel 21 from easily making shadow on the object.

In addition, in this embodiment, since the diffusing plate 22 constituting the light-exiting surface of the light emitter is located at the most object-side position, the lens barrel has no portion blocking the illumination light projected from the light emitter to the object, which enables efficiently illuminating the object.

Furthermore, in this embodiment, the optical filter attached to the filter screw 21*a* does not cover the light emitter (diffusing plate 22). This can prevent the illumination light reflected at the inner surface of the optical filter from influencing the illumination of the object, which enables good illumination of the object.

As illustrated in FIG. 3A, in the retracted state, the front barrel 21 including, in its front end portion, the light emitter and the filter screw 21*a* is retracted into the base barrel unit B to an out-of-sight position in side view. This can make the front end of the lens barrel flat in the retracted state, which enables providing an interchangeable lens with an improved design.

Although this embodiment described the case of providing as the accessory attachment portion the internal screw for attaching the optical filter, other accessory attachment portions than the internal screw, such as bayonet claws, may be provided. Furthermore, other accessories than the optical filter, such as a hood, may be attached to the accessory attachment portion.

Moreover, although the above embodiment described the case where the light emitter is constituted by using the two LED elements and the two light guides, the configuration of the light emitter is not limited thereto. For example, a ring-like light emitter may be constituted by circularly arranging a greater number of LED elements or a light emitter may be constituted by arranging LED elements at two horizontal positions.

In addition, although the above embodiment described the interchangeable lens having the configuration illustrated in FIG. 3B in the state where the movable barrel unit A is most protruded from the base barrel unit B, interchangeable lenses having other configurations are included in alternative embodiments of the present invention. It is only necessary that the interchangeable lens have the configuration illustrated in FIG. 3B at least in the state where the movable barrel unit A is most protruded from the base barrel unit B, in other words, in a state (protruded state) where image capturing of an object at a minimum focusing distance can be performed.

As described above, the interchangeable lens (optical apparatus) of the embodiment has, in the front end portion of the lens barrel, the accessory attachment portion inside further than the light emitter in the radial direction, which enables good illumination of the object with the illumination light from the light emitter while having the accessory attachment portion. Furthermore, in the macro image capturing, the front end of the lens barrel can be brought sufficiently close to the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-024158, filed on Feb. 10, 2016, which is hereby incorporated by reference herein in its entirety.

What is claimed is:

1. An optical apparatus comprising:
a lens barrel;
a most object-side lens held by the lens barrel; and
a light emitter and an accessory attachment portion that are provided in an object-side end portion of the lens barrel so as to be located outside further than the most object-side lens in a radial direction of the lens barrel, the light emitter emitting an illumination light, the accessory attachment portion allowing detachable attachment of an accessory,
wherein:
the accessory attachment portion is located inside further than the light emitter in the radial direction;
the lens barrel is provided with a concave space that opens toward an object side and is used for the attachment of the accessory;
the concave space is provided in the radial direction between the accessory attachment portion and the most object-side lens; and;
the lens barrel is provided with a slope surface formed so as to decrease an outer diameter of the lens barrel toward an object-side end of the lens barrel.

2. An optical apparatus according to claim 1, wherein the accessory attachment portion is provided on an opposite-to-object side further than a light-exiting surface of the light emitter.

3. An optical apparatus according to claim 1, wherein the light emitter includes:
a light source;
a light-guiding member guiding a light emitted from the light source toward the radial direction and toward an optical axis direction of the lens barrel; and a diffusing member diffusing the light from the light-guiding member.

4. An optical apparatus according to claim 3, wherein:
   a light-exiting surface of the light emitter is an object-side surface of the diffusing member; and
   the accessory attachment portion is provided, in the object-side end portion, on an opposite-to-object side further than the object-side surface of the diffusing member.

5. An optical apparatus according to claim 1, wherein the accessory attachment portion includes an internal screw.

6. An optical apparatus including a lens barrel, the apparatus comprising:
   a base barrel located outermost in the lens barrel in its radial direction; and
   a movable barrel holding a first lens located at a most object-side position in an optical axis direction in which an optical axis of the lens barrel extends, being located inside further than the base barrel in the radial direction and being protrudable to an object side with respect to the base barrel,
   wherein, in a state where the movable barrel is protruded to the object side with respect to the base barrel, the entire movable barrel and the entire base barrel are located inside further than a conic surface (a) whose apex is located at a minimum focusing distance or a working distance on the optical axis and (b) that passes through an intersection line at which a plane passing through an object-side surface vertex of the first lens and being orthogonal to the optical axis intersects with a cylindrical surface extending from an outer circumferential surface of the movable barrel toward the object side.

7. An optical apparatus according to claim 6, further comprising a light emitter provided in an object-side end portion of the lens barrel so as to be located outside further than the first lens in the radial direction, the light emitter emitting an illumination light.

8. An optical apparatus according to claim 7, further comprising an accessory attachment portion provided in the object-side end portion so as to be located outside further than the first lens in the radial direction and inside further than the light emitter in the radial direction, the accessory attachment portion allowing detachable attachment of an accessory.

9. An optical apparatus according to claim 8, wherein at least a part of the light emitter is located at the same position as that of at least a part of the accessory attachment portion in the optical axis direction.

10. An optical apparatus according to claim 8, wherein the accessory attachment portion is provided on an opposite-to-object side further than a light-exiting surface of the light emitter.

11. An optical apparatus according to claim 8, wherein the accessory attachment portion includes an internal screw.

12. An optical apparatus according to claim 7, wherein the light emitter includes:
    a light source;
    a light-guiding member guiding a light emitted from the light source toward the radial direction and toward the optical axis direction; and
    a diffusing member diffusing the light from the light-guiding member.

13. An optical apparatus according to claim 12, wherein:
    a light-exiting surface of the light emitter is an object-side surface of the diffusing member; and
    the accessory attachment portion is provided, in the object-side end portion, on an opposite-to-object side further than the object-side surface of the diffusing member.

* * * * *